US008198583B2

(12) United States Patent
Brekenfeld et al.

(10) Patent No.: US 8,198,583 B2
(45) Date of Patent: Jun. 12, 2012

(54) FRAGMENTATION OF ANALYTE IONS BY COLLISIONS IN RF ION TRAPS

(75) Inventors: Andreas Brekenfeld, Bremen (DE); Ralf Hartmer, Hamburg (DE)

(73) Assignee: Bruker Daltonik GmbH, Bremen (DE)

(*) Notice: Subject to any disclaimer, the term of this patent is extended or adjusted under 35 U.S.C. 154(b) by 296 days.

(21) Appl. No.: 12/428,172

(22) Filed: Apr. 22, 2009

(65) Prior Publication Data

US 2009/0283672 A1 Nov. 19, 2009

(30) Foreign Application Priority Data

May 15, 2008 (DE) ........................ 10 2008 023 694

(51) Int. Cl.
*B01D 59/44* (2006.01)

(52) U.S. Cl. ....................................... 250/282; 250/281

(58) Field of Classification Search ........................ None
See application file for complete search history.

(56) References Cited

U.S. PATENT DOCUMENTS

| | | | | |
|---|---|---|---|---|
| 5,128,542 | A * | 7/1992 | Yates et al. | 250/282 |
| 5,479,012 | A * | 12/1995 | Wells | 250/282 |
| 6,124,591 | A * | 9/2000 | Schwartz et al. | 250/282 |
| 6,285,027 | B1 * | 9/2001 | Chernushevich et al. | 250/287 |
| 6,545,268 | B1 * | 4/2003 | Verentchikov et al. | 250/287 |
| 6,570,151 | B1 * | 5/2003 | Grosshans et al. | 250/282 |
| 6,670,606 | B2 * | 12/2003 | Verentchikov et al. | 250/287 |
| 6,737,641 | B2 | 5/2004 | Kato | |
| 6,753,523 | B1 * | 6/2004 | Whitehouse et al. | 250/292 |
| 6,809,313 | B1 * | 10/2004 | Gresham et al. | 250/287 |
| 7,429,729 | B2 * | 9/2008 | Schultz et al. | 250/287 |
| 7,456,397 | B2 | 11/2008 | Hartmer et al. | |
| 7,476,853 | B2 * | 1/2009 | Zubarev et al. | 250/292 |
| 7,622,712 | B2 * | 11/2009 | Hager | 250/283 |
| 7,642,509 | B2 * | 1/2010 | Hartmer et al. | 250/282 |
| 7,847,246 | B2 * | 12/2010 | Brekenfeld | 250/290 |
| 7,919,747 | B2 * | 4/2011 | Green et al. | 250/282 |
| 2003/0141447 | A1 * | 7/2003 | Verentchikov et al. | 250/287 |
| 2003/0160169 | A1 * | 8/2003 | Baba et al. | 250/292 |
| 2004/0026610 | A1 * | 2/2004 | Abou-Shakra et al. | 250/281 |
| 2004/0051039 | A1 * | 3/2004 | Russ et al. | 250/288 |
| 2004/0173740 | A1 * | 9/2004 | McLuckey et al. | 250/288 |
| 2005/0242281 | A1 * | 11/2005 | Li | 250/292 |
| 2006/0054808 | A1 | 3/2006 | Schwartz | |
| 2006/0192100 | A1 * | 8/2006 | Zubarev et al. | 250/282 |
| 2006/0219898 | A1 * | 10/2006 | McLuckey et al. | 250/288 |
| 2006/0255261 | A1 * | 11/2006 | Whitehouse et al. | 250/288 |

(Continued)

FOREIGN PATENT DOCUMENTS

DE 102005025497 A1 * 12/2006

(Continued)

*Primary Examiner* — David A Vanore
*Assistant Examiner* — Andrew Smyth
(74) *Attorney, Agent, or Firm* — Law Offices of Paul E. Kudirka

(57) ABSTRACT

Analyte ions, particularly biopolymer ions, stored in an RF ion trap are ergodically fragmented by bombarding the analyte ions with collision ions, for example medium-mass, mono-atomic ions having a charge of opposite polarity to the charge of the analyte ions. Since the analyte ions are not fragmented by accelerating and/or exciting them to oscillations, as is the case with conventional collision-induced dissociation, the RF voltage of the ion trap can be set low enough that daughter ions with light charge-related masses that are produced by the fragmentation can also remain trapped in the ion trap.

17 Claims, 1 Drawing Sheet

U.S. PATENT DOCUMENTS

| | | | | |
|---|---|---|---|---|
| 2006/0284067 | A1* | 12/2006 | Senko et al. | 250/282 |
| 2006/0289747 | A1* | 12/2006 | Schultz et al. | 250/294 |
| 2007/0085000 | A1 | 4/2007 | Furuhashi et al. | |
| 2007/0114384 | A1 | 5/2007 | Berkout et al. | |
| 2008/0090298 | A1* | 4/2008 | Apffel | 436/86 |
| 2008/0093547 | A1* | 4/2008 | Hartmer et al. | 250/283 |
| 2008/0135747 | A1* | 6/2008 | Brekenfeld | 250/283 |
| 2008/0203288 | A1* | 8/2008 | Makarov et al. | 250/282 |
| 2008/0230691 | A1* | 9/2008 | Hager | 250/283 |
| 2009/0050798 | A1 | 2/2009 | Jackson et al. | |
| 2009/0114808 | A1* | 5/2009 | Bateman et al. | 250/282 |
| 2009/0302209 | A1* | 12/2009 | Green et al. | 250/282 |
| 2009/0302210 | A1* | 12/2009 | Castro-Perez et al. | 250/282 |
| 2009/0321628 | A1* | 12/2009 | Bateman et al. | 250/282 |
| 2010/0001180 | A1* | 1/2010 | Bateman et al. | 250/282 |
| 2010/0072360 | A1* | 3/2010 | Green et al. | 250/282 |
| 2010/0148056 | A1* | 6/2010 | Kenny et al. | 250/282 |
| 2010/0294923 | A1* | 11/2010 | Kenny et al. | 250/282 |
| 2010/0327157 | A1* | 12/2010 | Green et al. | 250/282 |
| 2011/0049353 | A1* | 3/2011 | Gilbert et al. | 250/282 |
| 2011/0057097 | A1* | 3/2011 | Bateman et al. | 250/283 |
| 2011/0095176 | A1* | 4/2011 | Castro-Perez et al. | 250/282 |

FOREIGN PATENT DOCUMENTS

| | | | | |
|---|---|---|---|---|
| EP | 1779406 | A2 | * | 5/2007 |
| GB | 2438488 | A | * | 11/2007 |
| WO | WO 02/101787 | A1 | | 12/2002 |
| WO | WO 2006003429 | A2 | * | 1/2006 |
| WO | WO 2007129107 | A2 | * | 11/2007 |

* cited by examiner

FRAGMENTATION OF ANALYTE IONS BY COLLISIONS IN RF ION TRAPS

BACKGROUND

The invention relates to the ergodic (thermal) fragmentation of analyte ions, particularly biopolymer ions, in order to determine their structure and polymer sequences in RF ion traps. Mass spectrometry always means ion spectrometry; hence the term "mass" never refers to the "physical mass" m but always to the "charge-related mass" m/z, where z is the number of excess elementary charges on the ion, i.e. the number of excess protons or electrons. The number z is always understood to be a pure number. The charge-related mass m/z represents the proportion of mass per elementary charge of the ion. The charge-related mass m/z is frequently (somewhat inappropriately) called mass-to-charge ratio, although it is the ratio of mass to the dimensionless number of elementary charges. Whenever the "mass of the ions" is referred to below, it is always to be understood as the charge-related mass m/z, unless expressly stated otherwise.

For an analysis of analyte ions in ion traps, particularly of polymers with sequences of different building blocks such as the biopolymers, the ionization is usually carried out by electrospraying. Electrospray ionization generates hardly any fragment ions; the positive ions are mostly those of the protonated analyte molecule. With electrospray ionization, multiply charged ions of the molecules are usually produced by multiple protonation; this multiple protonation makes the ions heavier than the neutral molecules by a corresponding number of daltons, and are therefore often called "pseudomolecular ions". For example, doubly and triply charged pseudomolecular ions occur for smaller molecules such as peptides, and ions with up to ten and even a hundred or more charges occur for proteins in the region of physical molecular masses between 5 and 100 kilodaltons.

In order to obtain information on the sequence of polymer building blocks when polymers are the analyte substances, one has to isolate the polymer ions from other ions in the mass spectrometer and then fragment them to produce neutral fragments and charged fragment ions. The mass spectra of the fragment ions are called fragment ion spectra. They contain ion signals arranged like ladders, and the distances between these ion signals allow the type of polymer building blocks and their sequence to be determined. Wherever possible, one starts with doubly to quadruply charged analyte ions for the fragmentation, because these have a very high yield of fragment ions and provide fragment ion spectra which are very easy to interpret.

The spectra of the fragment ions are also called "daughter ion spectra" of the selected "parent ions". "Granddaughter spectra" can also be measured as fragment ion spectra of selected daughter ions. These daughter ion spectra (and granddaughter ion spectra) can be used to identify structures of the fragmented parent ions; in the case of analyte ions of proteins, for example, it is possible (although difficult for some fragmentation methods) to determine at least parts of the amino acid sequence of a peptide or protein from these spectra.

The analyte substances investigated can belong to different classes of substance, such as proteins, polysaccharides, and also others such as our genetic material DNA. In the following, the invention is described using biopolymer ions, particularly protein ions, without intending to limit the invention to this class of substances. Short-chain proteins with less than about 20 amino acids are usually called "peptides"; when proteins are mentioned here, peptides shall always be included.

Paul RF ion traps use inhomogeneous RF fields to trap the ions. The RF fields generate so-called (fictitious) pseudopotentials, which form a storage well in which both positive and negative ions can be confined. In three-dimensional RF ion traps, the pseudopotential increases in all three spatial directions; in two-dimensional RF ion traps, only in two spatial directions; in the third spatial direction the ions must be trapped by other means, usually by DC potentials.

In the potential wells of RF ion traps, the ions can execute so-called secular oscillations (in addition to the fundamental oscillations imposed by the RF fields), their oscillation frequency decreasing monotonically with increasing charge-related mass m/z. Charging the trap with collision gas damps the secular oscillations; the ions then collect as a cloud in the minimum of the potential well. The specialist is aware of methods for RF ion traps which can be used to analyze the stored ions according to their mass by means of mass-selective ejection. These ion trap mass spectrometers are very inexpensive for the performance they achieve; their use is therefore extraordinarily widespread, with many thousands of these instruments in service. As explained below in more detail, RF ion traps can be designed as so-called 2D ion traps or 3D ion traps. However, the RF ion traps incorporated into mass spectrometers do not have to be used for measuring the mass; the ions stored can be transferred to a different type of mass analyzer for the acquisition of mass spectra.

Mass spectrometers with RF ion traps have characteristics which make them of interest for use in many types of analysis. In particular, selected ion species (the parent ions) can be isolated in the ion trap and then fragmented by various methods. The expression "isolation of an ion species" means that all ion species that are not of interest are removed from the ion trap by means of strong resonant excitation of their secular oscillations or other measures, so that only the required ions, the "parent ions", remain. These can then be fragmented and form the starting point for the measurement of fragment ion spectra uncontaminated by fragment ions of other substances.

RF ion traps have a peculiarity that is sometimes disadvantageous. They have a "minimum mass threshold" for the storage of ions. Ions with a charge-related mass m/z lower than this mass threshold cannot be stored in the ion trap. These light ions can be accelerated in just a single half-wave of the RF voltage to such an extent that they collide with the electrodes and are thus destroyed. The minimum mass threshold increases in strict proportion when the RF voltage is increased.

When, in the following, RF ion traps are mentioned, this refers not only to the ion traps in ion trap mass spectrometers but, in general, all ion traps in which ions are stored by pseudopotentials created by RF fields, and any gaps in the envelope of the pseudopotentials are closed by other means such as DC potential gradients. These ion traps also include hexapole and octopole rod systems, for example, and also axial arrangements of ring diaphragms with alternately applied phases of the RF.

Two fundamentally different types of fragmentation are now available in the various types of ion trap: "ergodic" fragmentation and "electron-induced" fragmentation. These two types of fragmentation lead to two significantly different types of fragment ion spectra, whose information content is complementary and which lead to particularly detailed information on the structures of the analyte ions when both types of fragment ion spectra are measured.

The term "ergodic" fragmentation of analyte ions here means a fragmentation where a sufficiently large excess of internal energy in the analyte ions leads to fragmentation. The excess energy can, for example, be introduced by a large number of relatively gentle collisions of the analyte ions with a collision gas; or by the absorption of a large number of photons from an infrared radiation source.

According to the ergodic theorem originally formulated by Boltzmann as a hypothesis, in a closed system such as a complex molecular analyte ion, when a certain energy is present, every state which can be realized with this energy will actually be realized in the course of time. This ergodic theorem is a mathematically proven form of the ergodic hypothesis, more precise for the ergodic quasi-hypothesis, in which every state will be realized in any pre-chosen approximation. Since fragmentation produces a possible, even if an irreversible, state, namely the creation of two particles from the analyte ion, fragmentation will occur at some stage. By absorbing energy, analyte ions called "metastable" ions are temporarily created, which then decompose at some time. The decomposition itself is characterized by a "half life", which is, however, dependent on the amount of surplus energy and cannot be determined unambiguously by today's methods.

The probability of ergodic cleavage of a certain bond depends on its binding energy. Only the weakest bonds of the analyte ion have a high probability of being cleaved. In proteins, the weakest bonds (except for side chains) are the so-called peptide bonds between the amino acids, which lead to fragments of the b and the y series, some occurring as charged fragment ions, some as neutral particles. Since the peptide bonds between different amino acids have slightly different binding energies, some peptide bonds of the analyte ion are more likely to be cleaved, and others less likely. As a result, not all fragment ions from peptide bonds in the fragment ion spectrum have the same intensity. Non-peptide bonds are so seldom cleaved that their fragments are typically not present in measurable quantities. In ergodic fragment ion spectra, there is no information about side chains like modifications of the amino acids, because all side chains get lost during fragmentation due to their low binding energy.

The conventional type of fragmentation of the analyte ions in RF ion traps is ergodic fragmentation by collisions of the somehow accelerated analyte ions with the collision gas contained in the ion trap, the excess internal energy of moving analyte ions being accumulated by collisions with the stationary collision gas molecules in the ion trap. In order for the collisions to be able to pump any energy into the analyte ion at all, they have to occur with a minimum collision energy. Since even gentle collisions of the analyte ions with the collision gas always may cause an internal cooling, i.e. a loss of internal energy from the analyte ion, there is always competition between "heating" and "cooling"; physically heavy ions, in particular, require a higher collision energy for the heating than light ions.

There are strict limitations on the collision gas in RF ion traps. On the one hand, the collision gas should serve to dissipate the kinetic energy of the analyte ions in order to collect the ions in the center of the ion trap. Here it is advantageous to use a collision gas that has small molecules and a relatively high density in the order of $10^{-1}$ to $10^{-2}$ pascal. Helium is usually used as the collision gas. Under these conditions, the mass-selective ejection of the ions for measurement of the masses is not significantly disturbed. This small-molecule collision gas is not particularly well suited to collision-induced dissociation. Nevertheless, no other collision gases have become established in commercial mass spectrometers.

In three-dimensional RF ion traps, the collision energy is generated in the conventional way by a limited resonant excitation of the secular ion oscillations of the parent ions with a dipolar alternating voltage. This leads to many collisions with the collision gas without removing the ions from the ion trap. The ions can accumulate energy in the collisions, which finally leads to ergodic decomposition and the creation of fragment ions. Until a few years ago, this collision-induced dissociation (CID) was the only known type of fragmentation in ion traps.

This collision-induced dissociation in three-dimensional RF ion traps also has disadvantages, however. For physically heavy analyte ions, it is necessary to set the RF voltage for storing the ions at a very high level in order to produce sufficiently hard collision conditions. This results in a very high minimum mass threshold for the ion trap. Ions below this mass threshold can no longer be stored; they are lost. The fragment ion spectrum therefore only starts at a mass which is about one third of the charge-related mass m/z of the analyte ion; the fragment ion spectrum can no longer provide any information on the lighter fragment ions because these ions are lost. Multiply charged physically heavy analyte ions of m>3000 dalton regularly have a low charge-related mass m/z of only about 800 to 1400 daltons, owing to the large number of protons; these analyte ions cannot be fragmented at all because the RF voltage cannot be set high enough to produce sufficient numbers of high-energy collisions.

Two-dimensional ion traps that are used as mass analyzers always have the form of quadrupole rod systems. In these 2D ion traps, the ergodic fragmentation is usually carried out in the same way by resonant excitation of the secular oscillations of the analyte ions for collisions with the collision gas; they therefore have the same problems as three-dimensional ion traps. In two-dimensional ion traps that are not also used as mass analyzers, the ion traps can take the form of hexapole or octopole rod systems, for example. In this case, the analyte ions can be injected axially into the collision gas with a specified kinetic energy. Here, also, the internal energy of the analyte ions is increased by a large number of collisions, and many analyte ions which have become metastable are subsequently ergodically fragmented. But here there are also upper limits for the mass of the analyte ions which can be fragmented, and here as well there are minimum mass thresholds below which fragment ions cannot be collected.

In order to also store very small fragment ions (particularly the so-called immonium ions, which consist of only one amino acid and are produced by internal fragmentation of fragment ions) by collision-induced dissociation, special methods have recently been elucidated which make use of the slow, metastable decomposition of the ions by the ergodic fragmentation process. These methods are quite useful, if a little complicated; they do not, however, deliver true-to-quantity reproduction of the fragment ions in the fragment ion spectra.

There remains the big disadvantage of collision-induced dissociation that with physically heavier analyte molecules above about 3000 daltons, the corresponding analyte ions can hardly be fragmented at all.

Document WO 02/101 787 A1 (S. A. Hofstadler, and J. J. Drader) elucidates that infrared multiphoton dissociation (IRMPD) can also be used in RF ion traps. The infrared radiation here is introduced into a three-dimensional RF ion trap via an evacuated hollow fiber with an optically reflective internal coating, through the perforated ring electrode. Thus, a further method for ergodic fragmentation is available with RF ion traps. This type of fragmentation is very advantageous because it can be carried out at low RF voltages; the small fragment ions are then also stored. The internal surfaces of the ion trap must be kept extremely clean because any molecules adhering to the walls are detached by the irradiation of the infrared photons, and these molecules then react in a variety of ways with the stored analyte ions. This is the main reason why there are still no commercially available ion trap mass spectrometers with this type of fragmentation.

We now turn to the electron-induced fragmentation methods. About ten years ago, a completely new type of fragmentation of protein ions was discovered: a non-ergodic fragmentation induced by the capture of low-energy electrons (ECD="electron capture dissociation"). By the direct neutralization of an associated proton, which is then lost as a radical hydrogen atom, the potential equilibrium of the protein ion in the vicinity of the neutralized proton is disturbed so much that a cleavage of the amino acid chain is induced by corresponding rearrangements. The cleavage fragmentation does not concern the peptide bonds, but adjacent bonds, leading to so-called c- and z-fragment ions.

This type of fragmentation is particularly easy to carry out in ion cyclotron resonance mass spectrometers because the low-energy electrons from a thermion cathode can easily be supplied along the lines of magnetic force to the stored cloud of analyte ions. ECD fragmentation can only be used in RF ion traps with some difficulty because the strong RF fields do not easily allow the low-energy electrons to come very close to the cloud of analyte ions. Nevertheless, there are a number of different solutions for ECD fragmentation in RF ion traps, but they each require costly apparatus and have not yet achieved a satisfactory sensitivity.

A method for the fragmentation of ions in RF ion traps has recently been elucidated which produces fragmentations similar to electron capture dissociation (ECD) but by a different reaction: "electron transfer dissociation" (ETD). This can easily be carried out in ion traps by adding suitable negative ions to the stored analyte ions. Methods of this type have been described in the patent publications DE 10 2005 004 324.0 (R. Hartmer and A. Brekenfeld) and US 2005/0199804 A1 (D. F. Hunt et al.). The fragment ions here belong (as in ECD) to the so-called c and z series, and are therefore very different to the fragment ions of the b and y series obtained by ergodic fragmentation. The fragments of the c and z series have significant advantages for determining the amino acid sequence from the mass spectrometric data, not least because the ETD fragment ion spectra can extend to lower masses than the collisionally induced fragment ion spectra. In particular, all the side chains are preserved during electron transfer dissociation, including the important posttranslational modifications such as phosphorylations, sulfations und glycosylations.

The fragmentation of protein ions by electron transfer (ETD) in an RF ion trap is brought about in a very simple way by reactions between multiply charged positive protein ions and suitable negative ions. Suitable negative ions are usually polyaromatic radical anions, such as those of fluoranthene, fluorenone, anthracene or other polyaromatic compounds. With radical anions, the chemical valences are not saturated, so they can easily donate electrons in order to achieve an energetically advantageous non-radical form. They are generated in NCI ion sources (NCI="negative chemical ionization"), most probably by single electron capture or by electron transfer. NCI ion sources are constructed, in principle, like ion sources for chemical ionization (CI ion sources), but operated differently in order to obtain large quantities of low-energy electrons. NCI ion sources are also called electron attachment ion sources.

It is now known that an electron transfer from highly excited neutral particles, for example by highly excited helium atoms from a "fast atom bombardment" (FAB) particle source, can also take place (DE 10 2005 005 743 A1, R. Zubarev et al.). This type of fragmentation is abbreviated to MAID ("metastable-atom induced dissociation"). Here, also, there are ECD-type fragment ion spectra. For the non-ergodic fragmentation process by neutralization of a proton by an electron, the source of the electron seems to be unimportant. The ECD, ETD and MAID types of fragmentation can therefore all be collectively referred to as "electron-induced" types of fragmentation.

Evaluation of the fragment ion spectra is very simple if they were produced from doubly to about quadruply charged parent ions, because doubly to quadruply charged fragment ions can be identified from the mass separations of their isotopic pattern, and because the fragment ion spectra are not too complex. It is a different situation if highly charged parent ions, for example parent ions carrying ten to thirty charges are subjected to this fragmentation process. The number of different fragment ions is extraordinarily high, and the vast majority of fragment ions cluster in the region of charge-related masses m/z from about 600 to 1200 daltons. The fragment ion spectrum is so complex that an evaluation is hardly possible, especially since the isotope patterns can no longer be mass-resolved in RF ion trap mass analyzers, and therefore the charge level can no longer be determined.

For de-novo sequencing, and also for other purposes such as the determination of posttranslational modifications (PTM), it is particularly advantageous to evaluate spectra acquired both by ergodic fragmentation and by electron-induced dissociation.

Ergodic fragmentation initially cleaves all posttranslational modifications that are only weakly bonded, such as phosphorylations, sulfations and glycosylations, and essentially displays the naked sequence of the unmodified amino acids of the analyte ions. Therefore, the types and positions of the posttranslational modifications cannot be identified. In contrast, these modification groups are not cleaved off by electron-induced fragmentation. In comparison with the ergodically obtained fragment ion spectra, an additional mass at an amino acid thus shows both the type and also the position of the modification. These extraordinarily important investigative results can only be obtained by comparing both types of fragment ion spectra.

De-novo sequencing is always desirable when searching in a protein sequence database using a search engine has not provided any useful results, for example because a protein of this type is not yet available in the database. A comparison of ergodic and electron-induced fragment ion spectra allows the ion signals to be immediately assigned to the c/b series or z/y series because there is a fixed mass difference between c-ions and b-ions and also between z-ions and y-ions, which makes identification easy. It is therefore very easy to read out partial sequences for both series of fragment ions.

The simple generation of ETD fragment ion spectra thus does not obviate the need to generate extensive ergodic fragment ion spectra, since it is only with both kinds of fragment ion spectra in parallel that a lot of valuable information on the structure of the analyte ions can be obtained. As has been described in detail above, the acquisition of informative ergodic fragment ion spectra from heavier analyte ions is still extraordinarily difficult, if not impossible, at present.

SUMMARY

The invention provides a method for ergodic fragmentation of analyte ions in RF ion traps in a mass spectrometer, wherein the increase in the internal energy in the analyte ions, which is required for the ergodic fragmentation, is induced by ion-ion collisions. Stationary analyte ions are preferably attacked by collisions with accelerated collision ions, instead of the analyte ions being accelerated and made to collide with stationary neutral particles. The analyte ions are almost at rest, grouped in a cloud in the center of the RF ion trap, while the collision ions are shot through the cloud of analyte ions with an average kinetic energy that is largely adjustable. Since the analyte ions are not accelerated and/or excited to oscillations, as is usually the case with collision-induced dissociation CID, the RF voltage of the ion trap can be set quite low so that daughter ions with light charge-related masses can also remain trapped. This method can also be used to fragment quite heavy ions with physical masses m of several kilodaltons, in contrast to the conventional collision fragmentation used until now.

The method can be carried out with collision ions that have the same polarity as the analyte ions, but it operates particularly favorably if the collision ions have an opposite charge to the analyte ions because, in this case, particularly large collision cross-sections exist. A particularly advantageous fragmentation, with a good fragmentation yield and essentially without any formation of complex ions, is achieved if monoatomic collision ions are selected. The use of positive ions of alkali atoms or negative ions of halogen atoms is particularly advantageous because their inert gas configuration makes them very stable and they have a particularly low tendency to subsequent or secondary reactions. For the fragmentation of positive analyte ions, the easily produced negative ions of fluorine, chlorine, bromine or, in particular, iodine can be used, for example; for the fragmentation of negative analyte ions, the positive ions of sodium, potassium, rubidium or, in particular, cesium are suitable. The use of isotopically pure substances for generating the collision ions is advantageous because they allow a more selective excitation and still allow simple interpretation of the resulting spectra in the event that reaction products are formed with the analyte ions. The elements iodine and cesium, and also fluorine and sodium naturally occur in the isotopically pure form. Overall, the negative ions of fluorine and particularly iodine, and the positive ions of sodium and particularly cesium therefore play a special role when used as collision ions.

In two-dimensional ion traps, the analyte ions collect in the axis. To prevent them escaping along the axis, they are usually trapped by DC electric fields, which are generated at apertured diaphragms mounted at both ends. The collision ions can simply be shot axially through these two-dimensional ion traps in a particularly advantageous way. They can emerge at the opposite end without being reflected. They therefore do not remain in the ion trap and so cannot contribute to a deprotonation of the analyte ions. Since the injected collision ions usually enter slightly off-axis and at small angles, they oscillate about the axis at their secular frequency as they fly through the ion trap and thus pass through the elongated cloud of analyte ions several times. It is advantageous to modulate the injection conditions, for example the kinetic energy of the collision ions, in order to constantly vary the wavelength of the oscillation and thus reach all the analyte ions.

In three-dimensional ion traps, the analyte ions collect in a small spherical cloud in the center of the ion trap due to the damping in the collision gas. If the collision ions are now injected, they initially oscillate with wide oscillatory motions through the cloud of the analyte ions. The strength and frequency of the oscillatory motion, and thus the average kinetic energy, depend on the value of the RF voltage. The closer the minimum mass threshold is to the mass of the collision ions, the faster, and thus more energetic, are the oscillatory motions. This allows the average kinetic energy for the collisions to be adjusted within limits. To prevent the collision ions from being damped by the collision gas within a few milliseconds, and thus mixing with the analyte ions, which would lead to a deprotonation of the analyte ions, it is expedient to continuously resonantly excite the collision ions a little. Alternatively, the collision ions can be repeatedly ejected from the ion trap by periodically raising the minimum mass threshold.

The collision ions can be generated in a special ion source in the vacuum section of the mass spectrometer, or can be supplied from an electrospray ion source outside the mass spectrometer. They can be cleaned by a mass filter to remove accompanying complex ions before being injected into the ion trap.

The fragment ions can be mass-analyzed by being mass-selectively ejected from the RF ion trap itself; it is also particularly possible to transfer the fragment ions from the RF ion trap to a high-resolution mass analyzer.

By means of a large surplus of collision ions, which can be advantageously produced in large quantities, the fragmentation process can be greatly shortened compared to conventional collision-induced dissociation. In particular, this also makes it possible—once the bombardment of the analyte ions with collision ions has finished and the remaining collision ions have been removed—to reduce the RF voltage to a level where even very small fragment ions, such as immonium ions, can be captured and analyzed above the minimum mass threshold after they have been generated in the ion trap by ergodic decay.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

A simple, but very effective, embodiment relates to two-dimensional ion traps in which the analyte ions collect in an elongated cloud along the longitudinal central axis. These ion traps can be constructed as quadrupole rod systems applied pair-wise with the two phases of an RF voltage; or with six straight pole rods as hexapole rod systems; or with eight or more pole rods as multipole rod systems. Such hexapole or octopole rod systems can often be found in mass spectrometers as "collision cells" for ergodic fragmentations, but there the analyte ions are always being injected into stationary collision gas. Two-dimensional ion traps are also known with coiled double or quadruple helices. Finally, they can be constructed as stacks of ring diaphragms, where the phases of an RF voltage are applied alternately to the ring diaphragms. To prevent the analyte ions from escaping along the axis, they are trapped by DC electric fields, which are usually generated at apertured diaphragms mounted at both ends.

The collision ions can simply be axially injected in a particularly advantageous way through these two-dimensional RF ion traps after the analyte ions have been stored. Since collision ions of opposite polarity are not held by the DC fields applied axially at the ends, they can emerge at the opposite end without being reflected. They thus do not remain in the ion trap, do not collect there, and therefore cannot contribute to a deprotonation of the analyte ions. Since the injected collision ions usually enter slightly off-axis and at small angles, they oscillate about the axis at their secular frequency as they fly through the ion trap and thus pass through the elongated cloud of analyte ions several times. It is advantageous to modulate the injection conditions, for example the kinetic energy of the collision ions, in order to constantly vary the wavelength of the oscillation and thus reach all the analyte ions.

Figure 2:
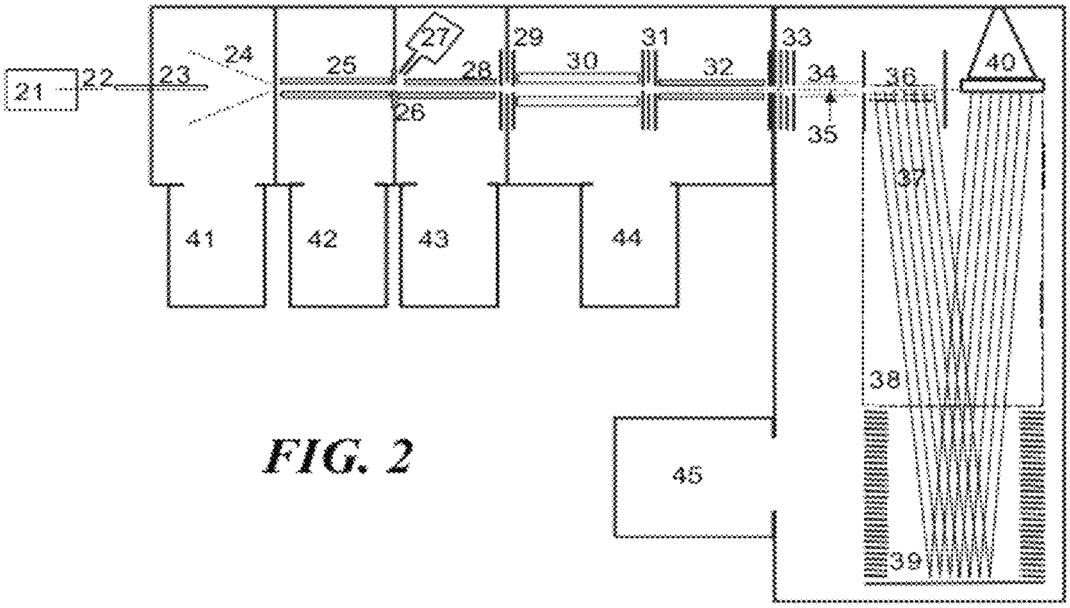
FIG. 2 shows a tandem mass spectrometer with an external electrospray ion source (21, 22) and a high-resolution time-of-flight analyzer (38). The fragmentation is carried out by collision ions from a vacuum-internal ion source (27) in a quadrupole fragmentation cell (30).

Such an arrangement is shown in FIG. 2. Analyte ions from an electrospray ion source (21, 22) are transported via an entrance capillary (23) into the vacuum, where they are collected by an ion funnel (24) and introduced into the first part (25) of an ion guide. They then pass via ion guide (28) into the fragmentation cell (30), which here is a quadrupole, in which the isolation of the parent ions can also take place. According to the invention, the parent ions can then be bombarded with collision ions with adjustable kinetic energy from the vacuum-internal ion source (27); these collision ions are introduced into the ion guide (28) by voltages at the diaphragm (26). The energy can be set by the lens system (29). The fragment ions can then be extracted through the lens system (31), cooled in the next ion guide (32), and formed into a fine beam (35) by the lens system (33) before being injected into the pulser (36) of the time-of-flight mass analyzer (38). Here they are pulsed out perpendicular to their original direction of flight, form the beam (37), which is reflected by a reflector (39) and impinges, highly mass-resolved, on the detector (40). High-vacuum pumps (41 to 45) maintain the vacuum in the various sections.

The collision ions can be produced in large quantities either in the special ion source (27) in the vacuum section of the mass spectrometer, or in the electrospray ion source (21, 22) outside the mass spectrometer. It is easily possible to generate cesium ions (mass 133 atomic mass units) or iodine ions (mass 127 atomic mass units) by spraying a solution of cesium iodide; preferably by using a second spray capillary (not shown in FIG. 2) in the electrospray ion source (21, 22). By generating the collision ions in the electrospray ion source, the method of the invention can be performed in any time-of-flight mass spectrometer with orthogonal ion injection equipped with an electrospray ion source (ESI-OTOF-MS).

Where necessary, the collision ions from the internal ion source (27) or the external electrospray ion source (21, 22) can be cleaned by a mass filter to remove accompanying complex ions before being injected into the collision ion trap (fragmentation cell) (30). When they are injected into the ion trap (30), their kinetic energy can be adjusted over a wide range; energies between 30 and 100 electronvolts have been shown to be advantageous. During each collision, a few electronvolts of energy is thus transferred to the analyte ion, which is usually not sufficient for a spontaneous fragmentation, particularly not for heavier analyte ions. The strong current of collision ions means that the energy of the analyte ions can be increased in a very short time, usually a few milliseconds. This is, advantageously, much shorter than the heating time in conventional collision-induced dissociation. More fragment ion spectra can thus be acquired in a given time. By being reflected outside the ion trap, the collision ions can be injected a second time through the ion trap and thus utilized even more efficiently.

The RF voltage at the electrodes of the two-dimensional ion trap can be set relatively low in order to also collect small fragment ions from the ergodic fragmentation. The fragment ion spectra thus cover a large mass range and are very informative. In order to also trap very light fragment ions, such as the so-called immonium ions, which each consist of only one amino acid, the RF voltage can be reduced even further after the analyte ions have been bombarded with collision ions. The immonium ions indicate which amino acids are present in the analyte ions investigated.

Such two-dimensional ion traps are not usually constructed as mass analyzers, so the fragment ions are subsequently transferred from the ion trap into a suitable mass analyzer, where they are analyzed. Particularly advantageous for this are high-resolution mass analyzers such as time-of-flight mass analyzers with orthogonal injection, ion cyclotron resonance analyzers or special electrostatic ion traps of the Kingdon type. For two-dimensional quadrupole ion traps there are embodiments which can also be used as mass analyzers themselves.

A further advantageous embodiment relates to three-dimensional ion traps where, after being introduced, the analyte ions collect in a small spherical cloud in the center of the ion trap owing to the damping in the collision gas. If collision ions of opposite polarity are now injected, they oscillate during the capture process, initially with wide oscillatory motions, through the cloud of analyte ions, where they can increase the internal energy of the analyte ions by collisions. As with the analyte ions before, the oscillatory motion of the collision ions is damped by the collision gas within a few milliseconds, depending on the pressure, and they collect in the cloud of the analyte ions. Since they would then react with the analyte ions causing mutual neutralization, this damping must be prevented.

Figure 1:
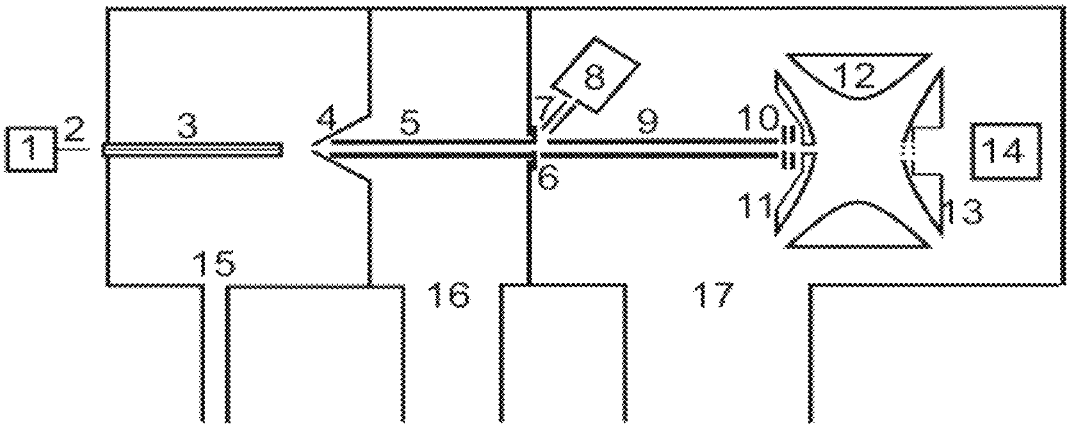
FIG. 1 represents a simple schematic array of an ion trap mass spectrometer for carrying out a method according to this invention, with an electrospray ion source (1, 2), a vacuum-internal ion source (8) for negative iodine ions and a 3D ion trap with end cap electrodes (11, 13) and ring electrode (12). The iodine ions from the ion source (8) are introduced into the 3D ion trap via the same ion guide (9)—here in the form of an octopole rod system—as the analyte ions from the electrospray ion source (1,2).

An advantageous embodiment of a three-dimensional ion trap to carry out a method according to the invention is shown schematically in FIG. 1. The ion trap here can also be used as a mass analyzer. Here, an electrospray ion source (1) with a spray capillary (2) outside the mass spectrometer is used to ionize the analyte ions, preferably biopolymer molecules. It will be assumed here that a mixture of digest peptides of a large protein is to be analyzed. The ions are guided in the usual way through an inlet capillary (3) and a skimmer (4) with the ion guides (5) and (9) through the pressure stages (15), (16), (17) to the 3D ion trap with end cap electrodes (11 and 13) and ring electrode (12), where they are captured in the usual way. The ion guides (5) and (9) comprise parallel rod pairs, across which the phases of an RF voltage are alternately applied. They can take the form of a quadrupole, hexapole or octopole rod system.

A first mass spectrum, obtained by resonant excitation of the unfragmented analyte ions with mass-selective ejection and measurement in the ion detector (14), provides an overview of the digest peptides. If it is intended to analyze the amino acid sequence of one of the peptides, the triply charged ions of this peptide are isolated by normal methods; this means that the ion trap is first overfilled and then all ions that are not triply charged ions of this peptide are ejected from the ion trap. The triple charge is recognized by the separation of the isotope lines, for triply charged ions this is exactly ⅓ of an atomic mass unit. If triply charged ions are not available in sufficient numbers, the doubly charged ions can also be used.

These multiply charged ions are decelerated into the center of the trap by a short delay of a few milliseconds by the ever-present collision gas. There they form a small cloud around one millimeter in diameter.

The negatively charged collision ions are then added. These ions are generated in a separate ion source (8) and guided via a small ion guide (7) to an ion merger, where they are introduced into the ion guide (9) leading to the ion trap (11, 12, 13). In the embodiment shown here, the ion merger simply comprises an apertured diaphragm (6), to which a suitable DC potential can be applied, and a shortening of two of the eight rods in the ion guide (9). It is particularly advantageous for this very simple type of ion merger if the ion guide takes the form of an octopole system. This ion merger can allow the ions of the electrospray ion source (1, 2) to pass unhindered when there are suitable voltages at the diaphragm (6); with other voltages the negative ions from the ion source (8) are reflected into the ion guide (9). They reach the ion trap via this ion guide (9), and are stored there in the usual way by an injection lens (10).

The strength and frequency of the initial oscillatory motion, and thus the average kinetic energy, depend on the value of the RF voltage. The closer the minimum mass threshold is to the mass of the collision ions, the faster and more energetic are the oscillatory motions. This allows the average kinetic energy for the collisions to be adjusted within limits. To prevent the collision ions from being damped by the collision gas within a few milliseconds, and so mixing with the analyte ions, it is expedient to continuously excite the collision ions in a weakly resonant way by a suitable AC excitation voltage, which is applied to both the end cap electrodes, for example.

After the heating of the analyte ions is complete, the collision ions must be removed from the ion trap. This can occur by an increased resonant excitation, and also by increasing the RF voltage to a level where the collision ions are no longer stably stored and leave the ion trap.

Instead of the permanent weak resonant excitation, the collision ions can also be repeatedly ejected from the ion trap by periodically raising the minimum mass threshold before they are damped too much. The raising of the minimum mass threshold only needs to last a few tenths of a millisecond. Newly injected collision ions then perform the further heating of the internal energy of the analyte ions for about one to two milliseconds.

After the heating process has finished and the collision ions have been removed from the ion trap, the RF voltage of the ion trap can also be decreased here in order to trap and analyze the light fragment ions which are produced by the further ergodic fragmentation.

Also in this case of a 3D quadrupole ion trap, the collision ions can be easily produced in large quantities in the electrospray ion source (1) outside the mass spectrometer, instead of using the special ion source (8) in the vacuum section of the mass spectrometer. For instance, cesium ions (mass 133 atomic mass units) or iodine ions (mass 127 atomic mass units) can produced by spraying a solution of cesium iodide; preferably by using a second spray capillary (not shown in FIG. 1) in the electrospray ion source (1) in addition to the spray capillary (2). By spraying rubidium bromide, rubidium ions (mass 85/97 atomic mass units) or bromide ions (mass 79/81 atomic mass units) may be generated, selected by the polarity of the spray voltage. If still lighter ions are to be used as collision ions, potassium chloride may be sprayed, forming either potassium ions (mass 40 atomic mass units), or chloride ions (mass 35/37 atomic mass units). By generating the collision ions in the electrospray ion source, the method of the invention can be performed in any 3D ion trap mass spectrometer equipped with an electrospray ion source.

A very similar method of ergodic fragmentation of analyte ions by permanently trapped, oscillating collision ions can also be carried out in two-dimensional quadrupole ion traps that are designed to operate as a mass analyzer. The two-dimensional ion trap must, however, be provided with closures at both axial ends which can hold ions of not just one, but both polarities in the ion trap, for example by pseudopotentials generated by inhomogeneous RF fields at grids or similar electrode structures.

Both two-dimensional and three-dimensional ion traps equipped with electronic controls for the mass-selective ejection of ions are widely used. The fragment ions can be mass-analyzed with these ion traps themselves, but there is a limit to the mass resolution and mass accuracy that can be achieved. If the masses of the fragment ions must be determined with a very high degree of accuracy, it is advantageous to transfer the fragment ions from the RF ion trap into a high-resolution mass analyzer.

In the case of two-dimensional ion traps, the fragment ions can subsequently be axially exported from the ion trap by any of widely known methods, transferred into a suitable mass analyzer and analyzed there. Particularly advantageous for this are high-resolution mass analyzers such as time-of-flight mass analyzers with orthogonal ion injection, ion cyclotron resonance analyzers or special electrostatic ion traps of the Kingdon type. But also with three-dimensional ion traps, it is possible to successfully export the fragment ions, taking special conditions into account, and introduce them into high-resolution analyzers.

The collision ions can be generated in a special ion source in the vacuum section of the mass spectrometer, or can be supplied from an electrospray ion source outside the mass spectrometer. They can be cleaned by a mass filter to remove accompanying complex ions before being injected into the ion trap.

Ion sources for vacuum-internal generation of the collision ions are known in principle and are not further explained here. An ion merger can be used to introduce the ions produced in the ion source into the ion guides, which convey the ions to the fragmentation cell. This type of ion merger is very simple and can often be retrofitted (including an ion source) into existing instruments. Other types of ion mergers can also be used, of course. U.S. Pat. No. 6,737,641 B2 (Y. Kato), for example, presents an ion merger, but it seems to be very complicated and expensive compared to the ion merger described above, and fundamentally changes the type of the instrument.

The ergodic fragmentation according to this invention, which is characterized by the bombardment of the stationary analyte ions with accelerated collision ions, has remarkable advantages compared to the methods used at present:

a. The method is very fast due to the strong current of collision ions; more fragment ion spectra can be acquired per unit of time.

b. The short heating time makes it possible to collect a large proportion of the light fragment ions by reducing the RF voltage after the heating of the analyte ions is complete and the collision ions are removed.

c. Even without a subsequent reduction in the RF voltage, much lighter fragment ions can be captured, by setting a low RF voltage, than was possible with previous methods.

d. In particular, the invention makes it possible for the first time to obtain a good yield when ergodically fragmenting analyte ions of a high physical mass of several kilodaltons.

e. If, in rare cases, complexes are nevertheless formed with the collision ions, it is easily possible to use mono-atomic collision ions to identify the complexes on the basis of their mass differences.

With knowledge of this invention, those skilled in the art can also create further methods which extend and complete the knowledge about structures of the substances analyzed. For example, from the fragment ions produced in this way it is possible to generate granddaughter ions, again by collisionally induced fragmentation. All these solutions are intended to be included in the basic idea of the invention.

What is claimed is:

1. A method for inducing ergodic fragmentation of analyte ions that have internal energies and are stored in an ion trap in a manner that the analyte ions are substantially stationary, comprising:

(a) generating collision ions; and (b) accelerating the collision ions and introducing the collision ions into the ion trap in a manner that the collision ions collide with the analyte ions thereby increasing the internal energies of the analyte ions to a level at which ergodic fragmentation occurs.

2. The method of claim 1, wherein the collision ions carry a charge opposite to a charge carried by the analyte ions.

3. The method of claim 1, wherein the collision ions are mono-atomic.

4. The method of claim 3, wherein the collision ions are isotopically pure.

5. The method of claim 3, wherein the analyte ions have a positive charge and the collision ions comprise negative ions of one of the group consisting of fluorine, chlorine, bromine and iodine.

6. The method of claim 3, wherein the analyte ions have a negative charge and the collision ions comprise positive ions of one of the group consisting of sodium, potassium, rubidium and cesium.

7. The method of claim 1, wherein a two-dimensional RF ion trap is used to store the analyte ions and wherein step (b) comprises axially injecting the collision ions into the ion trap.

8. The method of claim 7, wherein the collision ions pass through the ion trap and exit the ion trap and wherein the method further comprises re-injecting ions that exit the ion trap back into the ion trap.

9. The method of claim 7, wherein step (b) comprises axially injecting the collision ions into the ion trap with a varying kinetic energy.

10. The method of claim 1, wherein a three-dimensional RF ion trap with an RF voltage is used to store the analyte ions and wherein step (b) comprises introducing the collision ions into the RF ion trap with an energy and changing the energy of the collision ions by adjusting the RF voltage.

11. The method of claim 10, wherein the RF voltage is adjusted so that the collision ions are resonantly excited.

12. The method of claim 10, wherein the RF voltage is adjusted so that the collision ions are periodically ejected from the RF ion trap.

13. The method of claim 12, wherein the RF voltage is periodically increased to effect ejection of the collision ions.

14. The method of claim 1, wherein the ion trap is located in a vacuum section of a mass spectrometer and wherein step (a) comprises generating the collision ions in an ion source located in the vacuum section of the mass spectrometer.

15. The method of claim 1, wherein the ion trap is located in a vacuum section of a mass spectrometer and wherein step (a) comprises generating the collision ions in an electrospray ion source located outside the vacuum section of the mass spectrometer.

16. The method of claim 1, wherein the ion trap is an RF ion trap and wherein the method further comprises the step of mass-analyzing fragment ions produced by the ergodic fragmentation by mass-selectively ejecting the fragment ions from the RF ion trap.

17. The method of claim 1, wherein the ion trap is an RF ion trap and wherein the method further comprises the step of transferring fragment ions produced by the ergodic fragmentation from the RF ion trap to a high-resolution mass analyzer.

* * * * *